Nov. 16, 1943.    D. W. FETHER    2,334,399
METHOD FOR MAKING HEAT INSULATING MATERIAL
Filed April 27, 1942
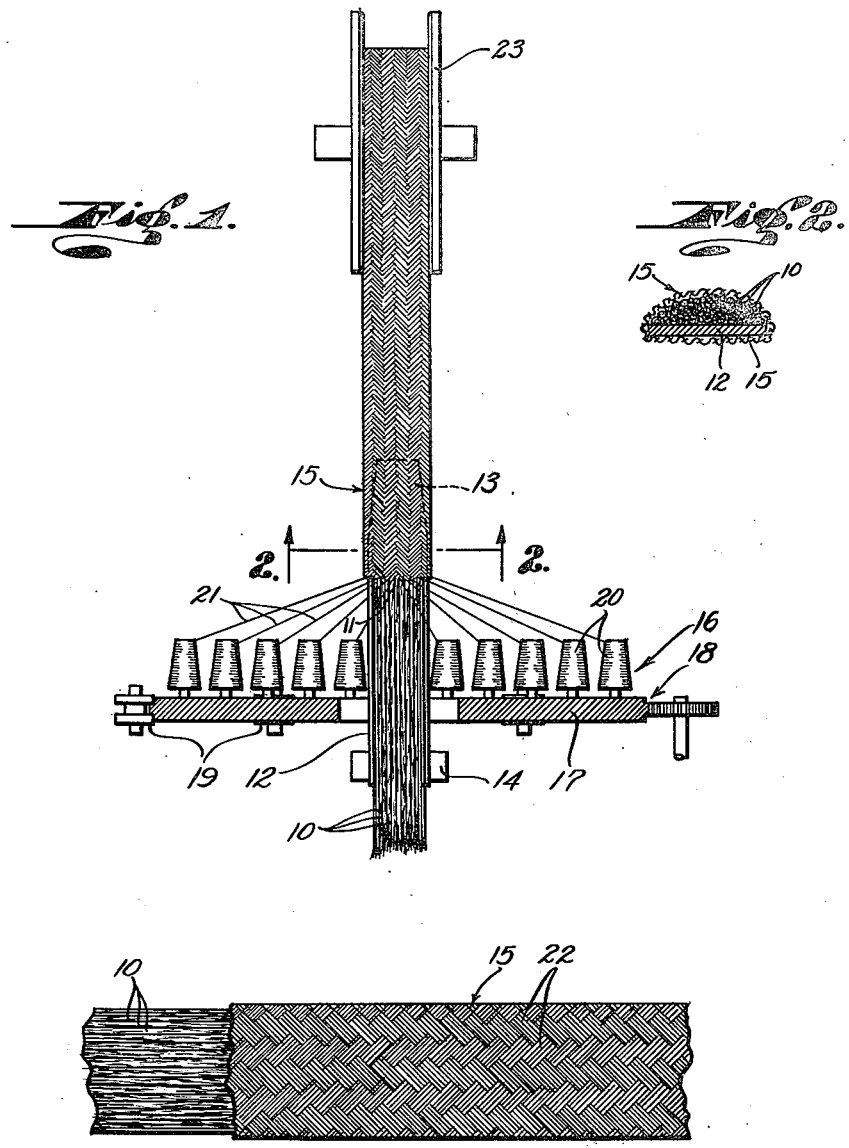

Patented Nov. 16, 1943

2,334,399

UNITED STATES PATENT OFFICE 2,334,399

METHOD FOR MAKING HEAT INSULATING MATERIAL

Donald W. Fether, Downey, Calif.

Application April 27, 1942, Serial No. 440,666

4 Claims. (Cl. 87—6)

The primary object of this invention is to provide an improved method for the manufacture of heat insulating materials of the form and composition more particularly dealt with in my copending application, Serial No. 440,667, entitled Heat insulating material, and filed on even date herewith.

The present type of insulating material may be described generally as being in elongated flexible form adaptable for spiral wrapping about a surface to be insulated, and comprising an outer tubular portion or jacket containing divided insulating material. Preferably, both the jacket and its contained material or filler are made of asbestos in certain particular forms and conditions highly advantageous for purposes of securing maximum insulating efficiency, as well as to permit manufacture of the material by a very simple and expeditious method.

Referring generally to past practices, insulating material of this general type has been made in the form of a jacket or outer portion made of relatively dense and closely woven asbestos sheet material, folded and secured as a tubular piece, and containing divided insulating material such as a mass of asbestos fibers in random, as distinguished from stranded, arrangement. Such prior materials have certain disadvantages with respect to manufacturing requirements and expense, principally because of the form and composition of the jacket portion, and in not having the adaptability to simultaneous weaving of the jacket and formation of the composite material, that is characteristic of the present invention.

I now provide a method of forming insulating material of improved physical characteristics, and being capable, by reason of those characteristics, of manufacture by processes inapplicable to materials of the form heretofore made. One feature of improvement consists in making the jacket in a continuously tubular form, using a type of weave rendering the jacket considerably softer, more flexible, and of sufficient looseness and porosity to substantially increase its insulating efficiency as compared with the closely woven fabrics heretofore used. Another outstanding advantage contemplated by the invention is the use of a filler material in the form of asbestos strands, preferably having no substantial twist, so that the assembled fibers have a desired strand continuity for purposes of the manufacturing process, and yet are not compacted so as to materially lessen the insulating efficiency of the filler mass.

According to the invention, provision is made for advancing the filler strands and simultaneously weaving a continuously tubular jacket about them, all in one continuous operation. My preferred method contemplates advancing the strands along a predetermined course, as against a mandrel or support, and simultaneously forming the jacket with a braid-type weave about the strands and mandrel, the latter at the time serving both as a guide for the strands and as a support for the jacket while it is being formed. The jacket is woven by a suitable type of weaving apparatus rotating about the mandrel and operating to form twisted asbestos yarns into a braided tubular and relatively loose weave. Advancement of the filler strands and the jacket as it is being woven, occurs by continuous withdrawal of the formed material from the mandrel.

To those skilled in the art, the method of making the insulating material and the operation of a typical and preferred form of apparatus used in its manufacture, will be readily apparent from the detailed description to follow. Reference is had throughout the description to the accompanying drawing, in which:

Fig. 1 is a general and diagrammatic view illustrating the operation of weaving the jacket about the mandrel and inner strand material, the rotary table of the weaving mechanism appearing in section;

Fig. 2 is an enlarged cross-section on line 2—2 of Fig. 1; and

Fig. 3 is a view showing the product material, a portion of the jacket being broken away to expose the filler strands.

As illustrated in Fig. 1, a suitable number of individual strands 10 of asbestos fibers are advanced upwardly along the face of a suitable support or mandrel 11, shown typically as a plate 12 (see Fig. 2) tapered toward the top as at 13, and stationarily mounted on a suitable support conventionally illustrated at 14. Preferably the strands 10 consist of substantially untwisted asbestos fibers held relatively loosely in the strand form in which the fibers are taken from the cards of the usual carding machine. The continuity of the strands permits continuous advancement of the filler insulation along the support or mandrel, and concurrent weaving of the surrounding jacket at a corresponding rate, all as will presently appear. By virtue of the relatively loose formation of the fibers in substantially untwisted strands, the individual strands, as well as the mass thereof, have the advantage of greater insulating qualities than a more dense or compact material, such as yarn with considerable twist. Thus the loosely stranded condition of the fibers assures the desirable continuity of the material, at virtually no loss of maximum insulating efficiency. It should be understood that the fibers in the strands 10 have been carded to the extent required for spinning, and that in the carding operation the natural asbestos fibers have become substantially completely divided or opened, as the expression is used.

The mandrel 11 serves both as a guide for the strands 10 and an internal support for the jacket 15 being continuously woven about the mandrel and strands. For reasons previously explained, it is particularly desirable to weave the jacket in continuous tubular form and with a type and size of weave giving the jacket great softness and flexibility, as well as substantial porosity, all of which properties enhance the ease of applicability of the material to the work, and its efficiency as thermal insulation. It is preferred to form the jacket with a braid-type weave substantially as shown in Fig. 3, and for this purpose I provide a suitable weaving mechanism, generally indicated at 16, rotatable about the mandrel 11 and operable to weave the jacket about the continuously advancing filler strands.

The weaving mechanism 16 may be of a known type comprising a table 17 rotatably driven as at 18 about the mandrel 11, and having suitable vertical supports, conventionally shown as rollers 19. The table 17 carries a circular arrangement of spindles or spools 20 of twisted asbestos yarn, from which the individual yarns 21 converge to weaving points about the mandrel and strands 10. As will be understood by those familiar with weaving, the placement of the yarn spindles and the arrangement in order of the yarn 21 upon convergence about the mandrel, can readily be made to produce a braid form of weave substantially as illustrated in Fig. 3. It may be observed that preferably the weave will consist of woven strands 22 each composed of a plurality of individual twisted yarns, four yarns to the strand being cited as typical. The rather loosely woven form of the jacket assures its complete flexibility and efficient insulating qualities, as mentioned in the foregoing.

The formed material is removed by suitable means from the mandrel at the rate at which the jacket is being woven. As illustrative, the material may be wound on a take-up reel 23 in the form of a convolute roll, in which condition the material may be distributed for use.

Although capable of various specific uses, the material is particularly adaptable for spirally wrapping heated tubular work, e. g., engine exhaust pipes, to be insulated. Ordinarily, the layer of the present material applied directly to the pipe will be given an outer wrapping or protective covering of relatively firm or dense material, such as a spiral wrapping of closely woven asbestos cloth.

I claim:

1. The method of making composite insulating tape of the character described, that includes advancing a mass of interengaging substantially untwisted and loosely constituted rovings of fibrous insulating material in random arrangement and simultaneously braiding an insulating jacket about said mass of rovings while internally supporting the jacket across its full width, as formed, and independently of the strip materials.

2. The method of making composite tape insulating material of the character described, that includes advancing a mass of interengaging substantially untwisted and loosely constituted small size asbestos fiber rovings in random arrangement and unrestrained against such advancement, and simultaneously braiding an insulating jacket about said mass of rovings while internally supporting the jacket across its full width, as formed, and independently of the strip materials.

3. The method of making composite tape insulating material of the character described, that includes advancing a mass of interengaging substantially untwisted and loosely constituted fibrous insulating material rovings in random arrangement, and simultaneously braiding an insulating jacket about said mass of rovings while internally supporting the jacket across its full width, as formed, at one side only of said mass of rovings and independently of the strip materials.

4. The method of making composite tape insulating material of the character described, that includes advancing a mass of interengaging substantially untwisted and loosely constituted small size asbestos fiber rovings in random arrangement and unrestrained against such advancement, and simultaneously forming an insulating jacket of loosely braided asbestos yarns about said rovings while internally supporting the jacket across its full width, as formed, at one side only of said mass of rovings and independently of the strip materials.

DONALD W. FETHER.